Nov. 29, 1966   D. HAMEL   3,288,500
FLEXIBLE JOINTS
Filed May 4, 1964
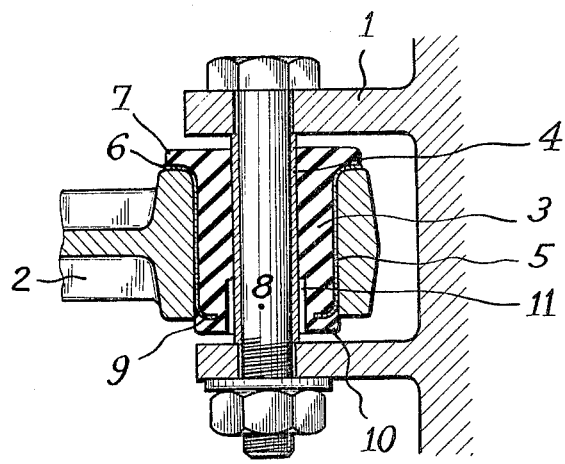
INVENTOR
Denis Hamel
By *Nilcomb, Wetherill & Brinton*
ATTORNEYS

United States Patent Office 3,288,500
Patented Nov. 29, 1966

3,288,500
FLEXIBLE JOINTS
Denis Hamel, Saint Mande, Seine, France, assignor to Societe Anonyme dite: Pneumatiques, Caoutchouc Manufacture et Plastiques Kleber Colombes, Colombes, Seine, France
Filed May 4, 1964, Ser. No. 364,675
Claims priority, application France, May 10, 1963, 934,541
3 Claims. (Cl. 287—85)

The present invention relates to flexible joints of the type comprising a rubber sleeve interposed between two coaxial metal bushes, viz an internal bush secured to rotate with a shaft of one of two parts to be connected by joint, and an external bush secured to the other part. In a joint of this type, angular movement between the two parts is permitted by torsional deformation of the rubber sleeve. Furthermore, the flexibility and suppleness of the rubber also allows other relative movements between the two joined parts, i.e. axial movements. In certain cases it is necessary to limit the amplitude of the axial movements and to this end joints have been proposed in which the external bush has at each end a flange extending radially towards the exterior, the rubber of the sleeve projecting above said flanges so as to form on each side stopper plugs limiting the axial movement. However in joints of this type having two flanges at the ends of the external bush, the joint cannot be assembled by simply fitting the parts secured to the external bush into a cylindrical bore, hence the need of providing a more complicated method of assembly. In certain cases two joints are assembled in opposition in alignment, each of said joints being provided with a single flange on the external bush, each joint limiting in one direction only the relative axial movement of the two parts. But this assembling of two joints in opposition is not always possible, either because it is too cumbersome or because the parts to be connected together are not symmetrical.

The present invention has for an object a flexible joint of the above-mentioned type having the particular advantage that it may be assembled by a simple sliding action from one side only of the part fitting into the external bush and that it is able to oppose the relative axial movements in both directions, of the parts which it is joining, and that it is easily produced.

The invention consists in a flexible joint of the type comprising a sleeve of elastic material interposed between an internal bush and an external bush, the external bush having at one end an exterior flange located axially within a raised rim of said sleeve wherein the external bush is provided at its end remote from said exterior flange with an inwardly-directed flange located axially within a raised edge of elastic material whereby the joint is able to oppose axial movements in both directions by means of said raised rim and edge while having an external form which simplifies production and assembly.

In order that the invention may be more clearly understood, reference will now be made to the accompanying drawing, showing an axial section through one embodiment thereof by way of example.

Referring to the drawing, there is shown a joint used for joining of two parts, such as, for example, a relatively fixed part 1 which may be, for instance, the chassis of an automobile vehicle, and an angularly movable part 2 such as a suspension arm.

The joint comprises a rubber sleeve 3 stuck or adhering by means of vulcanization to an internal bush 4 and to an external bush 5. The external bush 5 is constructed in a known manner as a cylindrical body, one end of which is broadened in the form of a flange 6 extending radially outwards to the exterior, said flange being located beneath a raised rim of rubber 7 which forms part of the rubber sleeve 3. The flange 6 rests upon a lateral face of the part 2 into which opens a cylindrical bore receiving the external bush 5. The internal bush 4 is in turn secured to the part 1 by means of a bolt 8. Assembly is such that the bushes 4 and 5 rotate with the parts 1 and 2 respectively, the angular movement between said two parts being permitted by torsional deformation of the rubber of the sleeve 3.

According to the invention, the external bush 5 is further provided at its other end with an inwardly extending flange 9. Said flange 9 is located approximately at the level of the lower side of the part 2 and is covered externally by a raised rubber edge 10 which may form part of the rubber of the sleeve 3 as shown the exterior diameter of said raised edge not exceeding that of the external bush 5. A recess 11 is provided in said sleeve 3 about the internal bush 4 and adjacent to the interior edge of the flange 9 so as to avoid shearing of the rubber in this area which has shrunk under the effect of the torsion of the sleeve 3 during angular movements of parts 1 and 2.

Due to the presence of the upper rim 7 and the lower edge 10 of rubber the joint is able to limit the relative axial movements of parts 1 and 2 in both directions, the raised rim and edges abutting after a predetermined travel against the surfaces adjacent to the part 1, and then causing the rubber of the rim and the edge to work in compression between one of the said surfaces and the corresponding flange. These results may be obtained by giving the joint an exterior shape such that it can be assembled in the part 2 by simple sliding into said part 2 from one of its lateral faces. The assembly of this joint is thus just as simple as that of the joint of the known art having only one flange.

Furthermore the form of the external bush 5 allows for very simple production by stamping followed by or combined with punching so as to leave the internal flange 9.

In a modification, the rubber of the lower raised edge 10 may be of greater hardness than that of the sleeve 3 so as to increase the stiffness of the stop member.

The term "rubber" is to be understood to mean natural or synthetic rubber or any other similar elastic material.

I claim:

1. A flexible joint comprising a sleeve of elastic material, a cylindrical internal bush located within and bonded to said sleeve, a cylindrical external bush located outside and bonded to said sleeve, one end of said external bush having a radially outwardly directed exterior flange, the adjacent end of said sleeve having a raised rim, said exterior flange being located axially within said raised rim, the other end of said external bush having a radially inwardly-directed flange, the end of said sleeve adjacent said inwardly-directed flange being formed with a raised edge that is of harder texture than the remainder of the sleeve, and said inwardly-directed flange being axially within said raised edge.

2. A flexible joint comprising a sleeve of elastic material, a cylindrical internal bush located within and bonded to said sleeve, a cylindrical external bush located outside and bonded to said sleeve, one end of said external bush having a radially outwardly-directed exterior flange, the adjacent end of said sleeve having a raised rim, said exterior flange being located axially within said raised rim, the other end of said external bush having a radially inwardly-directed flange, the end of said sleeve, adjacent said inwardly-directed flange having a raised edge, said inwardly-directed flange being axially within said raised edge, and said sleeve having a recess adjacent said inwardly-extending flange.

3. A flexible joint comprising a sleeve of elastic material, a cylindrical internal bush located within and bonded to said sleeve, a cylindrical external bush located outside and bonded to said sleeve, one end of said external bush having a radially outwardly directed exterior flange, the adjacent end of said sleeve having a raised rim, said exterior flange being located axially within said raised rim, the other end of said external bush having a radially inwardly-directed flange, the end of said sleeve adjacent said inwardly-directed flange being joined with a raised edge, that is of a harder texture than the remainder of the sleeve, said inwardly-directed flange being axially within said raised edge, and said sleeve having an annular recess around said internal bush and adjacent said inwardly-directed flange.

References Cited by the Examiner
UNITED STATES PATENTS

| | | |
|---|---|---|
| 1,888,642 | 11/1932 | Tryon. |
| 1,918,854 | 7/1933 | Mead. |
| 2,290,678 | 7/1942 | Dodge _____ 287—85 |
| 2,930,640 | 3/1960 | Davis et al. _____ 287—85 |

CARL W. TOMLIN, *Primary Examiner.*

A. V. KUNDRAT, *Assistant Examiner.*